(12) United States Patent
Harris

(10) Patent No.: US 9,026,799 B2
(45) Date of Patent: May 5, 2015

(54) USING BIOMETRICS AS AN ENCRYPTION KEY

(71) Applicant: Scott C. Harris, Rancho Santa Fe, CA (US)

(72) Inventor: Scott C. Harris, Rancho Santa Fe, CA (US)

( * ) Notice: Subject to any disclaimer, the term of this patent is extended or adjusted under 35 U.S.C. 154(b) by 21 days.

(21) Appl. No.: 13/933,273

(22) Filed: Jul. 2, 2013

(65) Prior Publication Data

US 2013/0297945 A1 Nov. 7, 2013

Related U.S. Application Data

(63) Continuation of application No. 09/577,449, filed on May 24, 2000, now Pat. No. 8,479,012.

(60) Provisional application No. 60/160,439, filed on Oct. 19, 1999.

(51) Int. Cl.
*G06F 21/00* (2013.01)
*G06F 21/32* (2013.01)
*G06K 9/00* (2006.01)
*H04L 9/08* (2006.01)

(52) U.S. Cl.
CPC *G06F 21/32* (2013.01); *G06K 9/00* (2013.01); *H04L 9/0866* (2013.01); *H04L 2209/805* (2013.01)

(58) Field of Classification Search
USPC ................................. 382/124, 125
See application file for complete search history.

(56) References Cited

U.S. PATENT DOCUMENTS

| | | |
|---|---|---|
| 5,712,912 A | 1/1998 | Tomko et al. |
| 5,790,668 A | 8/1998 | Tomko |
| 5,933,515 A | 8/1999 | Pu |
| 5,978,495 A | 11/1999 | Thomopoulos et al. |
| 6,002,787 A * | 12/1999 | Takhar et al. ............. 382/125 |
| 6,035,398 A | 3/2000 | Bjorn |
| 6,052,458 A | 4/2000 | Amir-Ebrahimi |
| 6,122,737 A | 9/2000 | Bjorn |
| 6,134,340 A * | 10/2000 | Hsu et al. ............. 382/124 |
| 6,202,151 B1 | 3/2001 | Musgrave et al. |
| 6,219,794 B1 | 4/2001 | Soutar et al. |
| 6,259,805 B1 | 7/2001 | Freedman et al. |
| 6,311,272 B1 | 10/2001 | Gressel |
| 6,317,508 B1 * | 11/2001 | Kramer et al. ............. 382/124 |
| 6,317,834 B1 | 11/2001 | Gennaro et al. |
| 6,487,662 B1 | 11/2002 | Kharon et al. |
| 6,507,662 B1 | 1/2003 | Brooks |
| 6,628,810 B1 | 9/2003 | Harkin |
| 6,714,665 B1 | 3/2004 | Hanna et al. |

OTHER PUBLICATIONS

A 600-dpi Capacity Fingerprint Sensor Chip and Image-Synthesis Technique IEEE Journal of Solid-State Circuits, U vol. 34. No. 4, Apr. 1999 Jeong-Woo Lee, Dong-Jin Min. Jiyoun Kim, and Wonchan Kim, Members, IEEE.

* cited by examiner

*Primary Examiner* — Kyung H Shin

(57) ABSTRACT

An image of an biometric part is used as encryption or decryption key. The biometric part image is obtained, and items within the biometric part are analyzed. Relationships between those parts are determined, e.g. ratios between different parameters of different parts. Those ratios are then used to form the key. A sequence of biometric information can used in which case both the information itself and the sequence are used to form to the key.

20 Claims, 2 Drawing Sheets

USING BIOMETRICS AS AN ENCRYPTION KEY

CROSS-REFERENCE OF RELATED APPLICATION

This application is a continuation of U.S. application Ser. No. 09/577,449 filed May 24, 2000, which claims priority from application No. 60/160,439 filed Oct. 19, 1999, the entire contents of the disclosure of which is herewith incorporated by reference.

BACKGROUND

Biometrics allows a person to use a unique part of their body for identification purposes.

Many different body part templates have been suggested for biometrics, including fingerprints, face prints, retinal scans and DNA sequences.

Many different ways of obtaining and using biometric information are well known in the art. The body part is compared with a prestored template. A match between the part and the template allows some action to be taken. Effectively these previous biometric systems used the biometric information as a key that opens a lock. The biometric information is compared with a template. The lock opens based on the comparison.

Continuing the analogy, once the key has unlocked the lock, the user has access to information.

Encryption has also been used for security, but in a different way. Encryption is used to change the information itself. No lock and key is necessary—the information can be disseminated, and the decryption key can be used to retrieve it.

Encryption is often used for messages, e.g. by email. Encryption is also used to keep private certain information in an account, for example.

One popular kind of encryption is public key cryptography. The encryption key is public and anyone can use it. Only the person having the private key can decrypt a message, however. If user A encrypts a message with user B's public key, only B can decrypt the message. No one else, not even user A, can decrypt the message. Other similar cryptosystems are known. All have in common that there must be a decryption key—typically a large number.

SUMMARY

It can be difficult to store the key for an encryption system. For instance, in a public key cryptography system, the user typically stores their private key inside their computer. However, a person with access to the user's computer can obtain access to the private key with much less security than is provided by the key itself. The private key is too long to memorize (e.g. 128 bits), and instead must be transported for example on a transportable storage medium. This is by itself inconvenient.

The present application teaches a way of using biometrics to form an encryption and/or decryption key. The biometric information itself is translated into an encryption and/or decryption key. Therefore, the key is always available to the user, since it is formed based on the user's body parts.

The key is formed by comparing the relationship of parts of the biometric information.

An aspect of the invention uses a sequence of biometric information as the key. Only the specified sequence forms a proper key. Therefore, surreptitiously obtaining the user's biometric information will not enable forming a proper key without also knowing the proper combination.

Another aspect uses relative information from the biometric information to form the key. In this way, the key is formed independent of the absolute dimensions of the biometric information. The key that is formed can use the obtained information as a "seed", or can use the information directly.

Yet another aspect uses the concept of relative dimensions with biometrics as they have been conventionally been conceived, to determine if the biometric information fits a proper profile, and use that recognition to allow access.

BRIEF DESCRIPTION OF THE DRAWINGS

These and other aspects of the invention will be described in detail with reference to the accompanying drawings, wherein.

DESCRIPTION OF THE EMBODIMENTS

Figure 1:
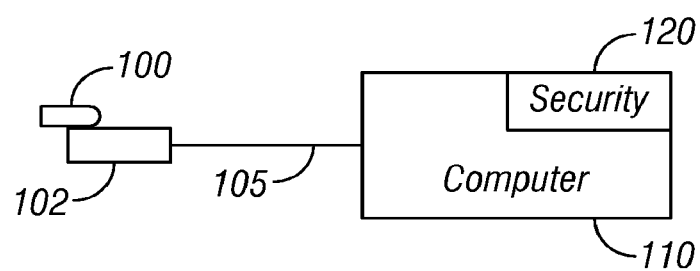
FIG. 1 shows an embodiment.

An embodiment is shown in FIG. 1. A personal computer system 99 includes a biometric reading device 102. The personal computer 99 itself runs an application software layer 110 (e.g. an operating system) that includes security software 120. The security software relies on a cryptographic key for its proper operation.

In a particularly preferred embodiment, the security software 120 is a public key encryption/decryption system. The private key is based on the user's biometric information.

FIG. 1 shows the user placing a body part 100 into a biometric reading device 102. The information from the user's body part 100 is transmitted along line 105 to software layer 110, running the application program 120, for example, a security program.

Figure 2:
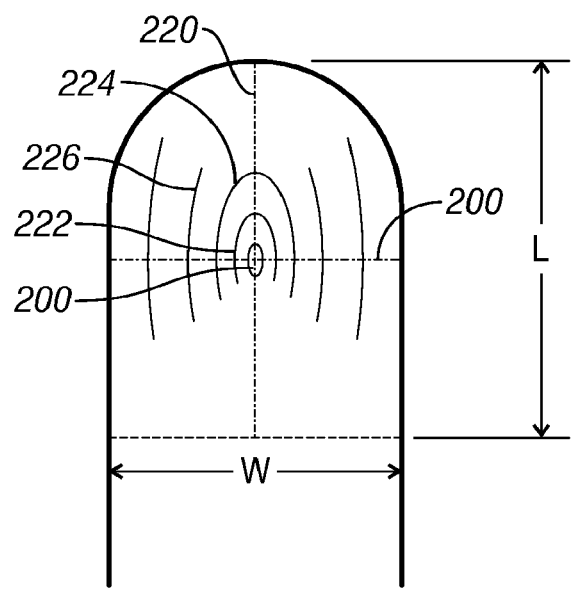
FIG. 2 shows a layout of an exemplary fingerprint.

The biometric device 102 can be any conventional fingerprint reader, which reads and produces an analog image or digital sample of the fingerprint. Either case produces what is effectively an image of the user's fingerprint. The image is conceptually shown in FIG. 2. All fingerprints have certain general characteristics. The fingerprints have a number of ridges 222, 224, 226, which come together at a substantially center point 200. The center point of the user's fingerprint is taken as a center line. A number of ridges are formed around that center point. The lines on each user's fingerprint are different. A typical fingerprint may have approximately 25 to 35 lines in the width wise direction, and approximately 30 to 60 lines in the length wise direction. In this embodiment, the center point 200 is used as a point to draw reference lines. The reference line 210 defines a widthwise direction and the line 220 defines a lengthwise direction.

Figure 3:
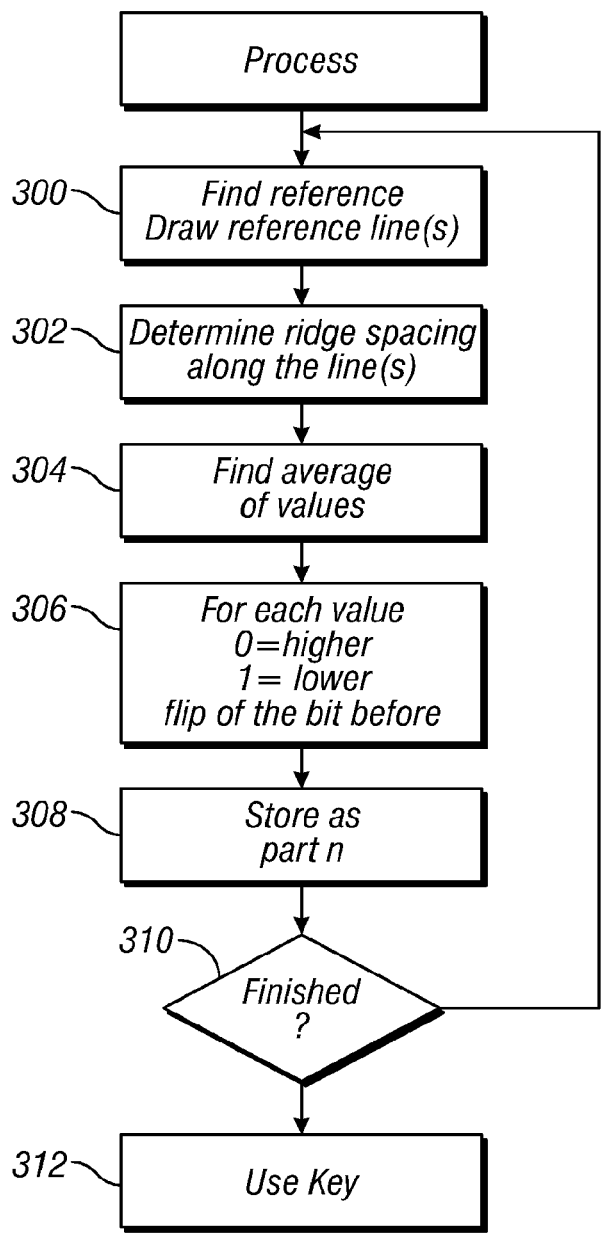
FIG. 3 shows a flowchart of operation.

Since a typical fingerprint scanner provides an image of the entire fingerprint, all of this processing can be done in the computer 99. This is carried out according to the flowchart of FIG. 3 which may run on computer 110.

At 300, the system finds a reference point and defines reference lines. The reference lines can include one line such as 210 in FIG. 2, or alternatively can be more than one reference line. A second reference line, for example could be reference line 220 in FIG. 2. Since the whole image of the fingerprint is available these lines can easily be made parallel or perpendicular to an "axis".

At 302, the system determines ridge spacing along the reference line. For example, in FIG. 2, a first ridge 222 closest to the determined center is taken as the first found ridge. This is the ridge closest to the reference point, and avoids determination of the edge of the fingerprint, or determining what is the first ridge. The ridge 222 in this embodiment is defined as the ridge, on the left, closest to the center. The second ridge 224 is the next ridge over to the left. The ridge 226 after that is the next ridge to the left. For purposes of illustration, the system determines the spacing between 10 ridges on the left and 10 ridges on the right. This produces 20 values.

At 304, the system finds the average of all the values.

Then at 306 the current value is compared to the average. "0" is defined if the current value is higher than the average, or a "1" if the current value is lower than the average. If the spacing is equal to the average, then the value is taken as the inverse of the bit before it.

Figure 4:
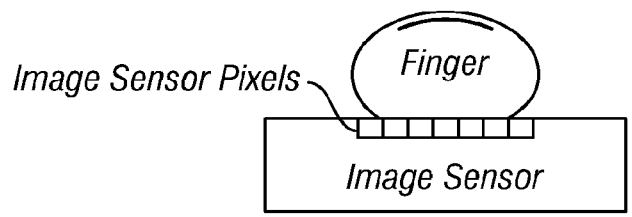
FIG. 4 shows a special kind of fingerprint reader, and an example of its operation.

A simple example is shown in FIG. 4. The sensor 100 detects distances, here shown as 5, 4, 6, 8, 9 and 4. The total of these is 36, and since third are six distances, the average is 6. Now each of the values is compared with the average, to obtain 00X110, since the last bit represents a tie. This flips the x bit before it to obtain 001110. At 308, the value thus obtained is stored as part n of the key. 310 detects if the key is complete. If so, the key is used at 312. If not, flow returns to 300 to obtain another part of the key. This can use another specified reference line, e.g., a perpendicular line such as shown as line 220. It could alternately and more preferably be biometric information from a different biometric part, e.g. a different finger.

The lines that are used to obtain the information can also be at specified angles to the reference lines, e.g., at 22 degrees. The angles can be set, or can be entered by the user, as a form of personal identification. For example, the user can enter 22 while a specified finger is in the reader. This takes the line along 22 degrees. It effectively forms a PIN that must be entered to obtain the proper code from the biometric information.

By piecing together the decryption key from different body parts, the present system also provides an additional layer of security. The system above has described getting about 20 digits from a single biometric scan. This may correspond to 20 bits. If two orthogonal dimensions are defined as shown in the picture, this doubles the amount of information to 40 bits. However, by combining three fingerprints, a much more robust key length of 120 bits can be obtained. Moreover, additional security is provided by the specific selection of fingerprints. Only the user knows which biometric items to input, how many, and in which order. This effectively forms a barrier against others using this information.

An advantage of the present system comes from the use of relative, rather than absolute, information. No calibration is necessary, since each of the values is calculated based on comparing parts of the fingerprint to itself, not to some absolute reference. The digits are unambiguous, since there is no calibration, only an internal sensing of relationships among the different parts. The only necessary commonality is resolution—the image sensor used must have sufficient resolution to sense each ridge of the fingerprint.

FIG. 4 shows an embodiment in which the fingerprint sensor is actually an image sensor chip, e.g., a CCD image sensor or active pixel sensor type device or infra-red photodetector. The chip's active surface is usually placed to receive the image of a larger area. However, in this embodiment, the pixels of the sensor are directly mapped to the user's finger. The finger is placed directly on the sensor. The position and orientation of the user's finger does not matter, since an unambiguous reference is obtained from the comparison of the different parts of the biometric information.

Another embodiment uses the relative relationship of the biometric information as described above in the conventional way that biometric information has been used. The relative relationship among the biometric information is used to form a number. That number is compared against a prestored number to determine identity. The test yields a pass if the information agrees.

Other biometric information can be used in a similar way. Retinal scans can be used by determining the same kind of relationship among lines of the scan, for example.

Other embodiments are within the disclosed invention.

What is claimed is:

1. A biometric analyzing device, comprising:
a scanning part that scans a biometric part of an individual, said scanning part including an image sensor integrated circuit having an active surface which receives radiation and produces an output indicative of an image of the radiation that is received, where said active surface is directly mapped to a user's body part, where the scanning part has pixels which respectively receive a part of the scan of the user's body part, and a size of the active surface is the same as a scanned area of the biometric part, and said pixels are directly mapped to the user's body part to produce information indicative of the scan of the biometric part;
a computer that analyzes said information in a way that is independent of orientation of the biometric part to create an output indicative of the scan of the biometric part;
wherein the computer stores a reference, and creates an indication of whether the scan of the biometric part matches to the reference, and further comprising a device that accepts entry of a value from the user, and uses said value as part of said matching to the reference.

2. The device as in claim 1, wherein said value is used for determining a portion of the biometric part to be scanned.

3. The device as in claim 1, wherein said output comprises a digital value that is based on the scanning of the biometric part, wherein said digital value is based on scanning the biometric part along the reference, and wherein the reference includes a reference line.

4. The device as in claim 3, wherein said output comprises a digital value that is based on the scanning of the biometric part, wherein said digital value is based on comparing values in the scan with averages of parts of the scan.

5. The device as in claim 3, wherein said digital value is based on scanning the biometric part along multiple orthogonal reference lines.

6. A device as in claim 4, wherein said computer determines an average of certain features within the biometric part and said reference is based on said average.

7. A system comprising;
a first scanning part that operates to scan a human body part and obtain scan information indicative of characteristics of said human body part;
a computer, storing plural files therein,
said computer running a routine that operates based on said scan information indicative of said body part, to obtain at least one reference within said scan information, and to obtain a digital value based on comparing said scan information of said human body part to said at least one reference by analyzing said scan information along at least one line relative to said at least one reference,
and said computer using a result of said analyzing to create the digital value indicative of the scan information, where individual bits of the digital value represent whether portions of the scan of the human body part along the line is higher than the reference or lower than the reference.

8. The system as in claim 7, wherein said digital value is used to obtain access to said plural files in said computer.

9. The system as in claim 7, wherein one of said bits of the digital value is inverted when a portion of the scan along the line is equal to the reference.

10. The system as in claim 7, wherein said analyzing operates by analyzing along the line comprises analyzing along a first line, and also analyzing along a second line that is orthogonal to the first line.

11. The system as in claim 7, wherein at least one of said references is an average of portions found within the scan.

12. The system as in claim 7, further including an input device, receiving information indicative of a value entered by a user into the computer and also said value.

13. The system as in claim 12, wherein said value that is entered by said user identifies characteristics of said line used in said analyzing.

14. The system as in claim 7, wherein said first scanning part includes an image sensor integrated circuit having an active surface which receives radiation and produces an output indicative of an image of the radiation that is received, where said active surface is directly mapped to a user's body part, where the scanning part has pixels which respectively receive a part of the scan of the user's body part, and a size of the active surface is the same as a scanned area of the user's body part, and said pixels are directly mapped to the user's body part to produce information indicative of the scan of the biometric part.

15. A method comprising;
scanning a human body part to obtain information indicative of characteristics of said human body part;
receiving scan information indicative of said scanning into a computer storing plural files;
said computer operating to obtain at least one reference within said scan information, and to obtain a digital value based on comparing said scan information of said human body part to said at least one reference by analyzing said scan information along at least one line relative to said at least one reference,
and said computer using a result of said analyzing to create the digital value indicative of the scan information, where individual bits of the digital value represent whether portions of the scan information is higher than the reference or lower than the reference.

16. The method as in claim 15, wherein one of said bits of the digital value is inverted when a portion of the scan along the line is equal to the reference.

17. The method as in claim 15, wherein said analyzing along the at least one line operates by analyzing along a first line, and also along a second line that is orthogonal to the first line.

18. The method as in claim 15, wherein at least one of said references is an average of portions found within the scan.

19. The method as in claim 15, further including an input device, receiving information indicative of a value entered by a user into the computer and said computer also and also on said value, wherein said value that is entered by said user identifies characteristics of said line that is used for said analyzing.

20. The method as in claim 15, wherein said scanning uses a scanning part which has pixels on a scanning surface which respectively receive a part of the scan of the user's body part, and a size of the scanning surface is the same as a scanned area of the biometric part, and said pixels are directly mapped to the user's body part to produce information indicative of the scan of the biometric part.

\* \* \* \* \*